United States Patent
Fornaeus et al.

(10) Patent No.: US 10,402,232 B2
(45) Date of Patent: Sep. 3, 2019

(54) METHOD AND SYSTEM FOR DETERMINISTIC MULTICORE EXECUTION

(71) Applicant: Wind River Systems, Inc., Alameda, CA (US)

(72) Inventors: Johan Fornaeus, Alameda, CA (US); Dennis Rice, San Francisco, CA (US)

(73) Assignee: Wind River Systems, Inc., Alameda, CA (US)

( * ) Notice: Subject to any disclaimer, the term of this patent is extended or adjusted under 35 U.S.C. 154(b) by 242 days.

(21) Appl. No.: 13/764,329

(22) Filed: Feb. 11, 2013

(65) Prior Publication Data

US 2014/0229956 A1 Aug. 14, 2014

(51) Int. Cl.
  *G06F 9/50* (2006.01)
  *G06F 1/32* (2019.01)

(52) U.S. Cl.
  CPC .............. *G06F 9/5083* (2013.01); *G06F 1/32* (2013.01); *G06F 9/5077* (2013.01); *G06F 2209/5021* (2013.01)

(58) Field of Classification Search
  CPC ................. G06F 9/5083; G06F 9/5077; G06F 2209/5021; G06F 1/3246; G06F 1/32
  USPC .................................................. 718/104, 105
  See application file for complete search history.

(56) References Cited

U.S. PATENT DOCUMENTS

| | | | | |
|---|---|---|---|---|
| 6,081,826 A * | 6/2000 | Masuoka et al. | ............. | 718/100 |
| 8,286,174 B1 * | 10/2012 | Schmidt et al. | ............. | 718/104 |
| 8,516,121 B1 * | 8/2013 | Telang et al. | ................. | 709/226 |
| 8,949,848 B2 * | 2/2015 | Heninger et al. | ............. | 718/104 |
| 2004/0255296 A1 * | 12/2004 | Schmidt et al. | .............. | 718/100 |
| 2009/0064158 A1 * | 3/2009 | Carter | ........................... | 718/104 |
| 2009/0083734 A1 * | 3/2009 | Hotra | ............................... | 718/1 |
| 2009/0248976 A1 * | 10/2009 | Rotithor | ........................ | 711/113 |
| 2010/0250998 A1 * | 9/2010 | Herdrich et al. | ............. | 713/501 |
| 2011/0078469 A1 * | 3/2011 | Therien | ................. | G06F 1/3203 713/320 |
| 2011/0167424 A1 * | 7/2011 | Murthy | ................. | G06F 9/4881 718/102 |
| 2014/0123151 A1 * | 5/2014 | Kishan | .................. | G06F 9/4881 718/103 |
| 2014/0215468 A1 * | 7/2014 | Huscroft | ............... | G06F 9/5022 718/100 |

* cited by examiner

*Primary Examiner* — Jacob D Dascomb

(74) *Attorney, Agent, or Firm* — Fay Kaplun & Marcin, LLP

(57) ABSTRACT

A system includes a memory including a plurality of software applications. The plurality of software applications includes a first software application and a second software application. The system also includes a deterministic group comprising a first processing core. The first processing core executes a first resource monitor and the first software application. The system also includes a constrained group comprising a second processing core. The second processing core executes a second resource monitor and the second software application. The first resource monitor detects an insufficient access to resources by the first software application and sends an indication to the second resource monitor. The second resource monitor receives the indication and instructs the second processing core to modify execution of the second software application.

15 Claims, 2 Drawing Sheets

US 10,402,232 B2

METHOD AND SYSTEM FOR DETERMINISTIC MULTICORE EXECUTION

BACKGROUND

Developers of integrated computing systems that must be safety certified or security evaluated may need to prove that their products can perform tasks within a defined time. In attempting to improve the overall performance of such systems, multiple processing cores may be used. However, to guarantee that the tasks of certified applications will comply with time constraints, systems may be configured to idle cores that are not running certified applications during the performance of tasks for certified applications. As a result, the performance benefits of having multiple processing cores are reduced.

SUMMARY OF THE INVENTION

The present invention is directed to a system including a memory including a plurality of software applications. The plurality of software applications includes a first software application and a second software application. The system also includes a deterministic group including a first processing core. The first processing core executes a first resource monitor and the first software application. The system also includes a constrained group including a second processing core. The second processing core executes a second resource monitor and the second software application. The first resource monitor detects an insufficient access to resources by the first software application and sends an indication to the second resource monitor. The second resource monitor receives the indication and instructs the second processing core to modify execution of the second software application.

The present invention is further directed to a method including executing, by a first processor, a first software application and a first resource monitor; executing, by a second processor, a second software application and a second resource monitor; detecting, by the first resource monitor, an insufficient access to resources by the first software application; sending, by the first resource monitor, an indication to the second resource monitor; and instructing, by the second resource monitor, the second processor to modify execution of the second software application.

The present invention is further directed to a tangible computer-readable storage medium including a set of instructions executable by a processor. The set of instructions, when executed by the processor, causes the processor to perform operations including executing, by a first processor, a first software application and a first resource monitor; executing, by a second processor, a second software application and a second resource monitor; detecting, by the first resource monitor, an insufficient access to resources by the first software application; sending, by the first resource monitor, an indication to the second resource monitor; and instructing, by the second resource monitor, the second processor to pause execution of the second software application.

DETAILED DESCRIPTION

Figure 1:
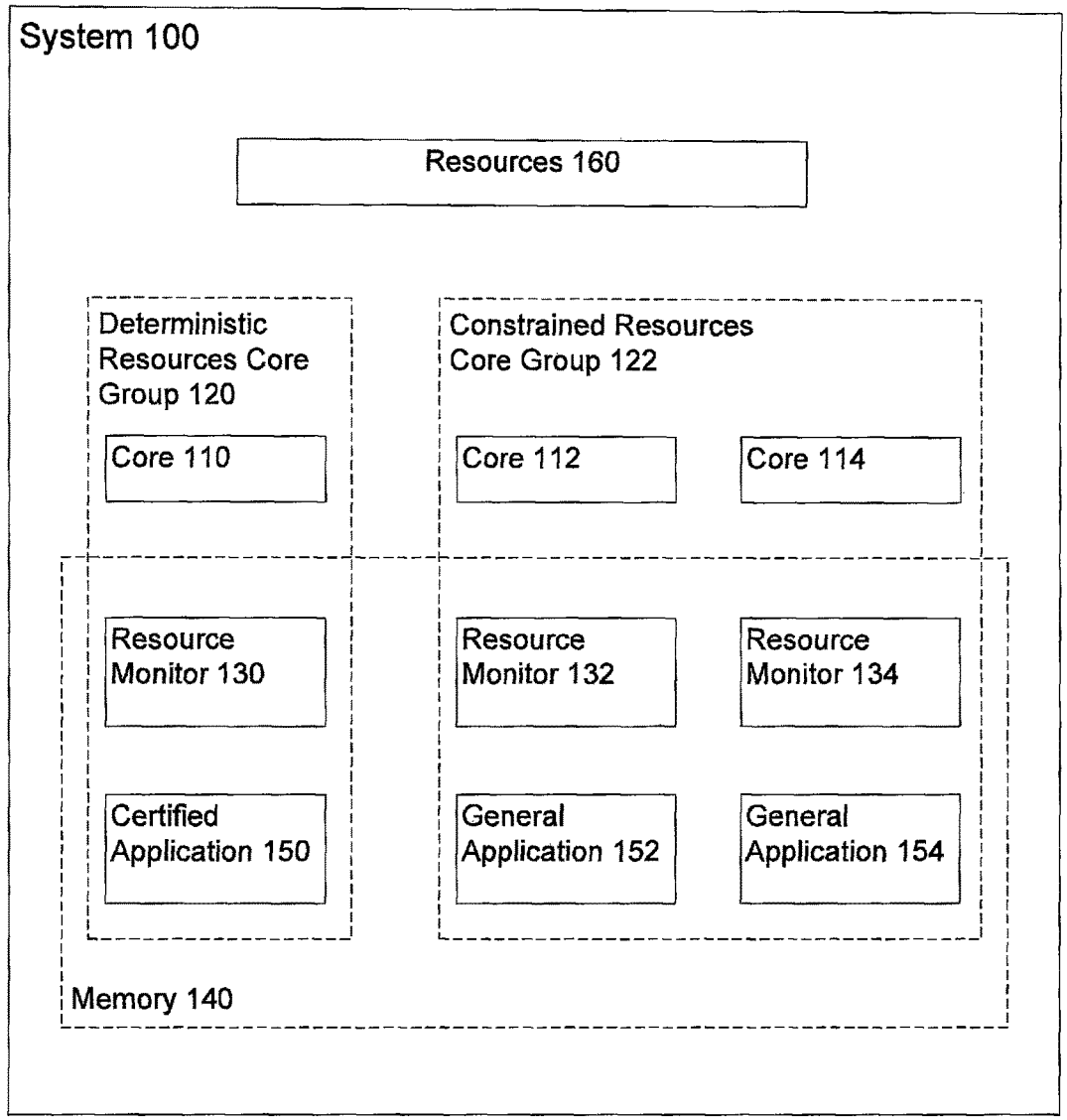
FIG. 1 shows a schematic illustration of a system for providing deterministic execution of software in a multicore operating environment according to an exemplary embodiment.

The exemplary embodiments may be further understood with reference to the following description of exemplary embodiments and the related appended drawings, wherein like elements are provided with the same reference numerals. Specifically, the exemplary embodiments relate to methods and systems providing for resource allocation to accomplish deterministic execution of tasks in a multicore computing environment.

Certified software applications, or combinations of hardware and software, commonly include time-critical execution tasks. This is because the system may be required to meet requirements of safety and other significant concerns (e.g., those of a regulatory body such as the Federal Aviation Administration). Developers may be required to prove that important tasks will be performed correctly and within a specified time interval (e.g., in a deterministic manner) in order to obtain certification. Certification may be based on a standard, such as general-purpose IEC 61508 functional safety standard or the DO-178C standard used by the FAA.

Modern computing environments typically utilize multiprocessor or multi-core system architecture, rather than increased clock speed, to increase their overall performance. However, obtaining certification for an application that runs on one core within a multi-core environment, while other cores run general non-certified applications, requires additional resource management, as compared to within a single-core environment. This is the case because it must be ensured that a core running a general application is not occupying resources needed by the core running the certified application.

Typically, this is accomplished through the use of task scheduling and synchronization. By scheduling tasks so that cores running general applications are not performing tasks when a core running a certified application is doing so, deterministic performance of the certified application may be ensured. However, this type of separation minimizes the benefits of a multi-core architecture. A multi-core system with hardware separation could potentially guarantee deterministic performance of a certified application running on one core without idling other cores, but hardware to accomplish this is extremely rare. The exemplary embodiments provide methods and systems for deterministic execution of a certified application on one core of a multi-core system, using a wide range of existing hardware, and without using scheduling to idle other cores that are executing non-certified applications.

FIG. 1 illustrates schematically an exemplary system 100. Though the system 100 will be described herein as including specific elements, those of skill in the art will understand that the elements listed are not intended to be an exhaustive list, and that other elements may be included in an implementation of the system 100. The system 100 includes processing cores 110, 112 and 114; those of skill in the art will understand that other multi-core computing environments may include a larger quantity of cores, and that the illustration of three cores is only exemplary.

The processing cores of system 100 may be subdivided into two groups: a deterministic resources core group ("DRCG") 120 including core 110, and a constrained resources core group ("CRCG") 122 including cores 112 and 114. The DRCG 120 may include one or more cores (e.g., in the embodiment of FIG. 1, a single core 110) executing certified applications in a deterministic manner. The CRCG 122 may include one or more cores (e.g., in the embodiment of FIG. 1, two cores 112 and 114) executing general applications in a best-effort manner.

Each of the cores 110, 112 and 114 executes a corresponding one of resource monitors 130, 132 and 134, in order to measure and regulate resource usage by the corresponding core. Each of the resource monitors 130, 132 and 134 may determine the existence of resource shortages for the corresponding core. The identification of a shortage may be made in a variety of manners. In one exemplary embodiment, a shortage may be identified based on a hardware performance counter such as by measuring cache misses, page misses, or interrupts and determining whether they exceed a threshold amount. In another exemplary embodiment, a shortage may be identified by periodically running a measuring function such as a test loop to determine whether execution time exceeds a threshold time. In another exemplary embodiment, an application running on a core may indicate to the appropriate resource monitor that it is unable to access sufficient resources for proper performance.

The resource monitors 130, 132 and 134 may be capable of communicating with one another by any method of inter-processor communications that is known in the art. Additionally, the resource monitors 130, 132 and 134 may be configured in a manner such that they may give instructions to their corresponding cores 110, 112 and 114 regarding the performance of tasks by the cores. Specifically, each of the resource monitors 130, 132 and 134 may be capable of instructing its corresponding core 110, 112 or 114 to pause the performance of tasks that it is currently executing for a specified period of time. Additionally, the resource monitors 130, 132 and 134 may be capable of making instructions to one another regarding the same type of pausing of tasks; more specifically, resource monitors of cores within the DRCG (e.g., resource monitor 130) may instruct other resource monitors to pause execution, while resource monitors of cores within the CRCG (e.g., resource monitors 132 and 134) may receive such instructions from other resource monitors. The cores may be allocated to either the DRCG 120 or the CRCG 122 as part of a system configuration process that identifies resource domains; this process may identify which cores have the authority to interrupt other cores.

The system 100 also includes a memory 140 (e.g., a hard drive, a solid state drive, a flash memory, etc.) storing data including applications that may be executed by the cores 110, 112 and 114. This may include certified application 150, which, as described above, may be certified to perform tasks in a manner in accordance with requirements as described above. Typically, certification may be for a combination of hardware and software (e.g., for the combination of certified application 150 as a whole), but, in other embodiments, the application (e.g., certified application 150) may be certified as a standalone component.

The memory 140 may also include general applications 152 and 154, which do not have such certification requirements. It will be apparent to those of skill in the art that the application referred to herein as certified application 150 may be, in other embodiments, an application requiring deterministic execution for any other purpose, and is not limited to applications requiring deterministic execution for purposes of certification.

The system 100 also includes limited-capacity resources 160. The resources 160 are described in a collective manner herein, but it will be apparent to those of skill in the art that this may include varying quantities of resources, including any type of resource with a limited capacity that a processing core may need to access in order to perform tasks relating to an application being executed by the processing core. This may include memory (e.g., random access memory or cache memory), networking resources (e.g., a wireless or wired network interface), input/output resources (e.g., a data capture apparatus, a display driver, etc.), data buses, or any other type of computing resource.

Figure 2:
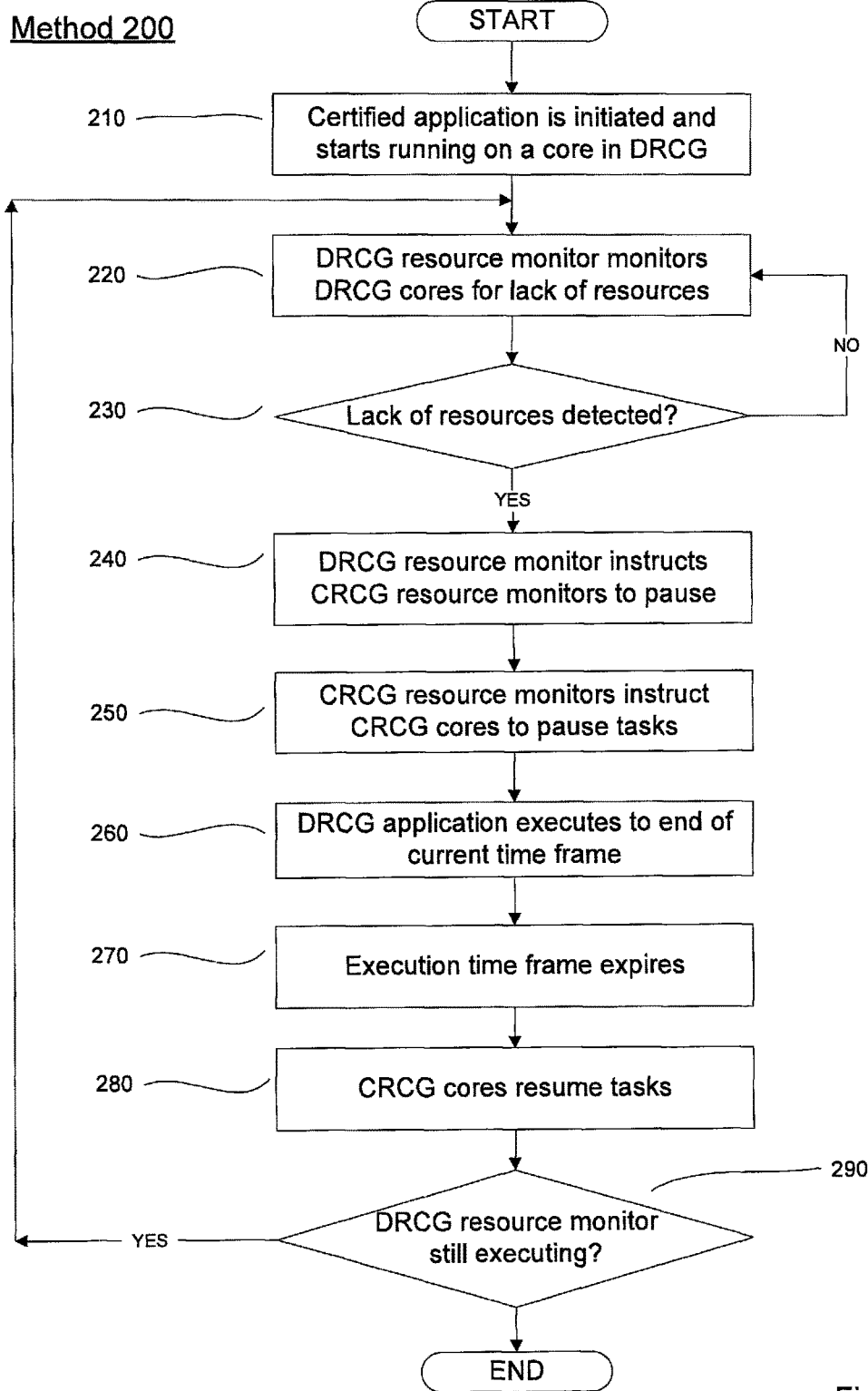
FIG. 2 shows an exemplary method for providing deterministic execution of software in a multicore operating environment using a system such as the system of FIG. 1.

FIG. 2 illustrates an exemplary method 200 providing for deterministic execution of a certified application on one core of a multi-core system. The method 200 will be described with reference to the system 100, but those of skill in the art will understand that the steps of method 200 are also capable of being performed by different arrays of hardware without departing from the general principles described; specifically, the method 200 will be described with reference to actions taken by resource monitors 130, 132 and 134 of system 100. In step 210, core 110 commences execution of certified application 150. It will be apparent to those of skill in the art that this step may occur because a user initiates certified application 150, because the certified application 150 has been launched as a result of some other event that has occurred within or external to system 100, at a prescheduled point in time, or for any other reason that a software application may be initiated.

In step 220, the resource monitor 130 that corresponds to core 110 monitors the performance of core 110. In one exemplary embodiment, the resource monitor 130 may constantly monitor the performance of core 110. In another exemplary embodiment, the resource monitor 130 may be constantly executed by core 110, but may only perform monitoring tasks when core 110 is running a certified application such as certified application 150. In a further exemplary embodiment, the resource monitor 130 may be executed by the core 110 only when a certified application such as certified application 150 is concurrently being executed by the core 110.

As described above, resource monitor 130 monitors core 110 for evidence of resource shortages, such as inability to access resources 160 expediently; this may be achieved by monitoring cache misses, page misses, or interrupts, by the execution of a measuring function such as a test loop, or by monitoring the certified application 150 for indications that it is unable to access sufficient resources for proper performance. Such a shortage may adversely impact the performance of certified application 150, causing it not to perform to required levels.

In step 230, the resource monitor 130 determines whether there has been an indication that the core 110 has insufficient access to resources, in, for example, one of the manners described above. If no insufficient access to resources is identified, the method returns to step 220, and the resource monitor 130 continues monitoring the core 110. In some embodiments, the monitoring may be on a continuous basis, e.g., the resource monitor 130 may constantly listen for indications of a lack of resources from certified application 150. In other embodiments, the monitoring may be done periodically, such as the resource monitor running a test loop at a set interval, such as once every millisecond.

If the resource monitor 130 determines in step 230 that the core 110 has insufficient access to resources, then the method continues to step 240. In step 240, the resource monitor 130 of the core 110 that is executing certified application 150 instructs the resource monitors 132 and 134 of cores 112 and 114 in CRCG 122 to pause tasks for applications being executed by cores 112 and 114, such as general applications 152 and 154. It will be apparent to those of skill in the art that, because the cores of the CRCG 122 may be subject to pausing in this manner, these cores may not be permitted to run certified applications.

Upon receiving the instruction of step 240, in step 250 the resource monitors 132 and 134 of the cores 112 and 114 in the CRCG 122 instruct their corresponding cores 112 and 114 to pause execution of tasks relating to applications they are presently executing, such as general applications 152 and 154. Based upon receiving this instruction, the cores 112 and 114 pause execution of tasks that they are presently running.

In step 260, the certified application 150 executes its tasks; those of skill in the art will understand that the specific tasks to be performed will vary depending on the nature of the certified application 150. It will be apparent to those of skill in the art that, with the cores 112 and 114 having paused execution of tasks in step 250, the certified application 150 may enjoy sufficient access to resources 160, and will therefore be able to perform tasks in a deterministic manner and comply with certification requirements. The time interval during which the certified application 150 performs tasks in this manner may vary among differing embodiments. In one embodiment, the certified application 150 executes tasks until the end of a current time frame. However, in other embodiments, other durations are possible; for example, the certified application 150 may alternately execute tasks in this manner for a predefined period of time.

In step 270, the time frame of step 260 (e.g., as described above, at the end of the current time frame of the certified application 150 or at the end of the predefined time period) expires. Upon this expiration, in step 280, the cores 112 and 114 in CRCG 112 resume execution of tasks relating to applications they are presently executing, such as general applications 152 and 154.

In step 290, it is determined whether the resource monitor 130 is still running. In a preferred embodiment, the resource monitor 130 may execute continuously whenever the core 110 of DRCG 120 is operational. This may ensure that there is never a lack of resources for certified applications, may avoid intercore work to synchronize cores to utilize periods when certified applications are not running, and may continuously gather measurements that may subsequently be used for certifying certified applications or analyzing resource usage. However, the resource monitors (e.g., resource monitor 130) may be terminated, such as by a user, in order to minimize utilization of resources and, thereby, improve performance. If the resource monitor 130 is still running, the method 200 returns to step 220, and the resource monitor 130 continues monitoring as described above. If the resource monitor 130 is no longer running within DRCG 120, then the method 200 terminates.

In one exemplary embodiment, the resource monitor 130 may continue to monitor resource accessibility by the core 110 even when the certified application 150 is not being executed by the core 110; in such an embodiment, the method 200 may continually return to step 120 so long as the system 100 is active. It will be apparent to those of skill in the art that in other exemplary embodiments, a multi-core operating environment similar to the exemplary system 100 may include more than one core within its DRCG. In such an embodiment, any resource monitor for a core within the DRCG may instruct the cores in the CRCG to pause execution in the manner described above.

The behavior modification of the exemplary embodiments may not be restricted to stopping execution on the cores of the CRCG 122. In another exemplary embodiment, the cores of the CRCG 122 may be throttled down rather than being completely paused. In one such embodiment, the cores of the CRCG 122 may be placed in a low-power mode (e.g., using a hardware feature), which forces the cores of the CRCG 122 to restrict their use of the resources 160.

In another exemplary embodiment, the resource monitors monitoring cores running general, non-certified tasks (e.g., resource monitors 132 and 134 of cores 112 and 114 of FIG. 1) may also be configured to detect resource shortages and to pause the execution of general applications (e.g., applications 152 and 154) while such shortages are occurring. In one embodiment, these monitors may be configured with a lower shortage threshold (e.g., less evidence of a shortage may be required before a shortage is identified and resulting action is taken). Such an embodiment may be advantageous because it is faster for a resource monitor to pause the execution of tasks on its own core than to request the pausing of tasks on other cores.

The exemplary embodiments may enable certified software applications, or other applications requiring deterministic execution, to be executed within multi-core operating environments without advance scheduling for cores not running such applications to be idle during the performance of tasks for the certified application. In such an embodiment, a developer of a certified application may comply with certification requirements by documenting the amount of time required by a resource monitor such as the resource monitor 130 of FIG. 1 to detect a shortage and the settling time to resolve such a shortage, and proving that the application to be certified can perform in accordance with its requirements (e.g., perform tasks in a set time period) based on these times to detect and resolve shortages. As a result, the exemplary embodiments, and particularly the resource monitors described above, may enable developers of computing systems running certified software applications, or of the software applications themselves, to better realize the performance advantages of multi-core operating environments. This may be accomplished while sufficiently guaranteeing deterministic execution of certified software applications, or other applications requiring deterministic execution, and using currently available hardware.

Those of skill in the art will understand that the above-described exemplary embodiments may be implemented in any number of manners, including as a software module, as a combination of hardware and software, etc. For example, the resource monitors 130, 132 and 134 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A system, comprising:
 a memory including a plurality of software applications, the plurality of software applications including a first software application and a second software application, wherein the first software application includes specific tasks to be executed within a specified time interval;
 a first group of processing cores comprising a first processing core, the first processing core executing a first resource monitor and the first software application; and a second group of processing cores comprising a second processing core, the second processing core executing a second resource monitor and the second software application, wherein the second resource monitor determines whether the first processing core has sufficient access to resources for executing the specific tasks within the specified time interval based on a predetermined threshold of resources, wherein when the second resource monitor detects an insufficient access to resources by the first processing core for executing the specific tasks of the first software application within the specified time interval the second resource monitor instructs the second processing core to modify execution of the second software application, wherein the modifying execution of the second software application comprises one of pausing execution of the second software application and throttling execution of the second software application for the specified time interval, wherein the first software application is a first type of software application and wherein only the first group of processing cores are configured to execute the first type of software application.

2. The system of claim 1, wherein the first resource monitor is configured to detect whether the first processing core has the sufficient access to resources for executing the specific tasks within the specified time interval and detects the insufficient access to resources by the first processing core based on receiving a notification from the first software application.

3. The system of claim 1, wherein the first resource monitor is configured to detect whether the first processing core has the sufficient access to resources for executing the specific tasks within the specified time interval and detects the insufficient access to resources by the first processing core based on monitoring performance of the first processing core.

4. The system of claim 3, wherein monitoring performance of the first processing core comprises detecting one of cache misses, page misses, interrupts generated, and a hardware performance counter failing to meet a performance threshold.

5. The system of claim 1, wherein the first resource monitor is configured to detect whether the first processing core has the sufficient access to resources for executing the specific tasks within the specified time interval and detects the insufficient access to resources by the first processing core based on executing a measuring function.

6. The system of claim 5, wherein the measuring function is a test loop.

7. The system of claim 1, wherein the first software application is a certified software application.

8. A method, comprising:
executing, by a first processing core from a first group of processing cores, a first software application and a first resource monitor, wherein the first software application includes specific tasks to be executed within a specified time interval;
executing, by a second processing core from a second group of processing cores, a second software application and a second resource monitor, wherein the second resource monitor is configured to determine whether the first processing core has sufficient access to resources for executing the specific tasks within the specified time interval based on a predetermined threshold of resources;
determining, by the second resource monitor, an insufficient access to resources by the first processing core for executing the specific tasks for the first software application in the specified time interval based on detecting that the predetermined threshold has been satisfied; and
instructing, by the second resource monitor, the second processing core to modify execution of the second software application, wherein the modifying execution of the second software application comprises one of pausing execution of the second software application and throttling execution of the second software application for the specified time interval, wherein the first software application is a first type of software application and wherein only the first group of processing cores are configured to execute the first type of software application.

9. The method of claim 8, wherein the first resource monitor is configured to detect whether the first processing core has the sufficient access to resources for executing the specific tasks within the specified time interval and detects the insufficient access to resources by receiving a notification from the first software application.

10. The method of claim 8, wherein the first resource monitor is configured to detect whether the first processing core has the sufficient access to resources for executing the specific tasks within the specified time interval and detects the insufficient access to resources by monitoring performance of the first processing core.

11. The method of claim 10, wherein monitoring performance of the first processing core comprises detecting one of cache misses, page misses, interrupts generated, and a hardware performance counter failing to meet a performance threshold.

12. The method of claim 8, wherein the first resource monitor is configured to detect whether the first processing core has the sufficient access to resources for executing the specific tasks within the specified time interval and detects the insufficient access to resources by executing a measuring function.

13. The method of claim 12, wherein the measuring function is a test loop.

14. The method of claim 8, wherein the first software application is a certified software application.

15. A tangible non-transitory computer-readable storage medium including a set of instructions executable by a processor, the set of instructions, when executed by the processor, causing the processor to perform operations comprising:
executing, by a first processing core from a first group of processing cores, a first software application and a first resource monitor, wherein the first software application includes specific tasks to be executed within a specified time interval;
executing, by a second processing core from a second group of processing cores, a second software application and a second resource monitor, wherein the second resource monitor is configured to determine whether the first processing core has sufficient access to resources for executing the specific tasks within the specified time interval based on a predetermined threshold of resources;
determining, by the second resource monitor, an insufficient access to resources by the first processing core for executing the specific tasks for the first software application in the specified time interval based on detecting that the predetermined threshold has been satisfied; and instructing, by the second resource monitor, the second processing core to pause execution of the second software application for the specified time interval,
wherein the first software application is a first type of software application and wherein only the first group of processing cores are configured to execute the first type of software application.

\* \* \* \* \*